Figure 1A:
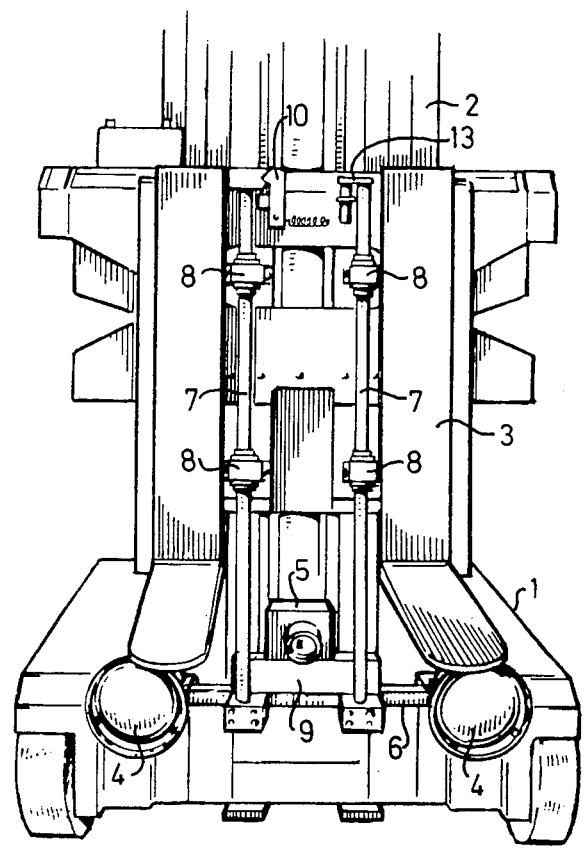

United States Patent [19]

Ahlbom

[11] 4,279,328

[45] Jul. 21, 1981

[54] DEVICE FOR ORIENTING A LIFTING MEANS, FOR EXAMPLE, IN RELATION TO A LOAD

[75] Inventor: Sten H. N. Ahlbom, Västra Frölunda, Sweden

[73] Assignee: AB Volvo, Goteborg, Sweden

[21] Appl. No.: 30,828

[22] Filed: Apr. 17, 1979

[30] Foreign Application Priority Data

Apr. 28, 1978 [SE] Sweden ............................... 7804927

[51] Int. Cl.³ ............................................... B66B 9/20
[52] U.S. Cl. .................................. 187/9 R; 250/222 R
[58] Field of Search ........................ 187/9 R, 9 E, 1 R; 414/660, 661, 662, 663, 664, 666, 667; 250/222 R, 223 R

[56] References Cited

U.S. PATENT DOCUMENTS

| | | | |
|---|---|---|---|
| 3,462,610 | 8/1969 | Frost .................................. | 250/223 R |
| 3,672,470 | 6/1972 | Ohntrup ............................. | 187/9 R |
| 3,749,830 | 7/1973 | Blitchington ..................... | 250/222 R |
| 3,890,221 | 6/1975 | Muehlethaler ..................... | 250/222 R |
| 3,945,730 | 3/1976 | Simecek et al. .................. | 250/222 R |

FOREIGN PATENT DOCUMENTS

| | | | |
|---|---|---|---|
| 2058014 | 11/1970 | Fed. Rep. of Germany | .......... 187/9 R |
| 2254012 | 11/1972 | Fed. Rep. of Germany | ...... 250/223 R |
| 2248323 | 4/1974 | Fed. Rep. of Germany | ...... 250/222 R |
| 2250277 | 4/1974 | Fed. Rep. of Germany | ...... 250/222 R |
| 2153547 | 2/1975 | Fed. Rep. of Germany | .......... 187/9 R |
| 536790 | 6/1973 | Switzerland | ........................ 250/222 R |

*Primary Examiner*—F. J. Bartuska
*Assistant Examiner*—Kenneth Noland
*Attorney, Agent, or Firm*—Young & Thompson

[57] ABSTRACT

A device for orienting a movable object such as a lifting fork truck in a certain position relative to a second object such as a load, the device having light-emitting device for illuminating the second object so that an image with lighter and darker fields is created thereon, a photoelectric detector movable together with the movable object to scan the image, electronic control equipment connected to the detector for receiving signals therefrom, and operating equipmenT for the movable object, connected to the control equipment to receive signals therefrom and to orient the movable object, dependent on the signals of the photoelectric detector, to the control equipment.

12 Claims, 10 Drawing Figures

DEVICE FOR ORIENTING A LIFTING MEANS, FOR EXAMPLE, IN RELATION TO A LOAD

The present invention relates to a device for orienting a movable object, for example a lifting means or a tool, in a certain position in relation to a second object, e.g. a load or a workpiece.

One purpose of the invention is generally to achieve a simple and inexpensive device which makes it possible to automatically and with great precision make fine adjustments of the positioning of the movable object relative to the second object and after the objects via other means have been roughly positioned in relation to each other.

A particular purpose of the invention is to achieve such a device which is especially suited for use in connection with remote-controlled goods vehicles, preferably remote-controlled fork-lift trucks, to finely adjust the fork in relation to, for example, a loading pallet in a pallet rack after the fork-lift truck has been driven up and the fork roughly positioned in front of the pallet with the aid of the truck's remote control system which can, for example, comprise an electrical control wire running in the floor.

This is achieved according to the invention by means of a device which has light-emitting means disposed to illuminate the second object so that an image consisting of lighter and darker fields is created on the second object, a photoelectric detector which is movable together with the movable object to scan said image, electronic control equipment connected to the photoelectric detector to receive signals from the same, and operating equipment for the movable object connected to the control equipment to receive signals from the control equipment and orient the movable object, dependent on the signals of the photoelectric detector, to the control equipment.

The invention is based on the idea of, instead of using various types of "markings" on the second object, e.g. magnetic strips for electromagnetic detection, using the shape and structure of the object and with the aid of a light source illuminating the second object so that a distinct image created by shadows and reflections is obtained on the object, said image then being detected electro-optically. Such a solution provides high accuracy and quick measurement at reasonable cost and involves substantial advantages, especially in connection with the handling of loading pallets, which are often subjected to rough handling with the risk that any separate marking attached to the pallet, such as magnetic strips, can be damaged or fall off, making guiding-in of the fork impossible.

A standard loading pallet, a so-called "Europe pallet" has, on its lifting sides or short sides under the load-carrying platform, three spaced foot blocks, the spaces between the blocks forming openings for the respective fork bars of a truck fork. When employing the invention in a fork-lift truck, the special shape of the loading pallet is used in an advantageous manner to achieve said image consisting of different light and dark fields. When illuminated, lighter fields are obtained where the blocks are placed and darker fields across the intermediate spaces for the fork. With the aid of this image the device according to the invention can make the required correction of the vertical and lateral positioning of the fork by means of the remote control system, so that the tips of the fork bars are positioned right in front of the darker fields regardless of irregularities in the floor, elasticity in the fork suspension, dimensional inaccuracy in the pallet rack, etc.

Figure 1B:
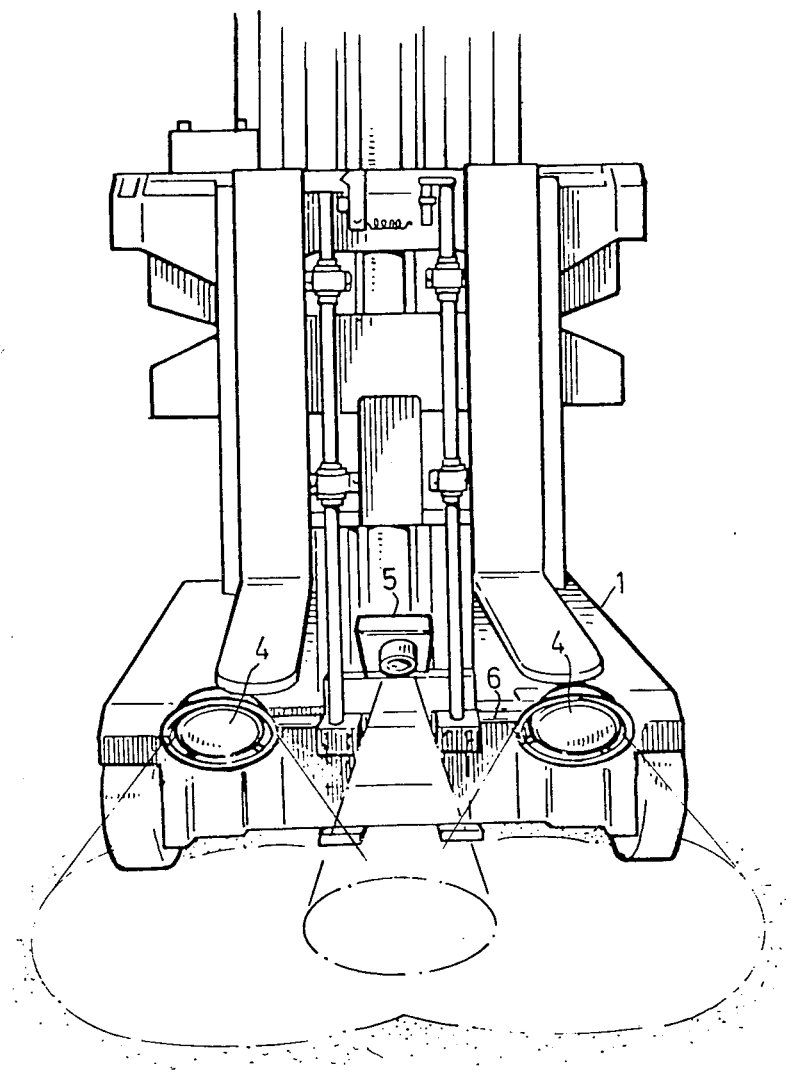
Figure 2:
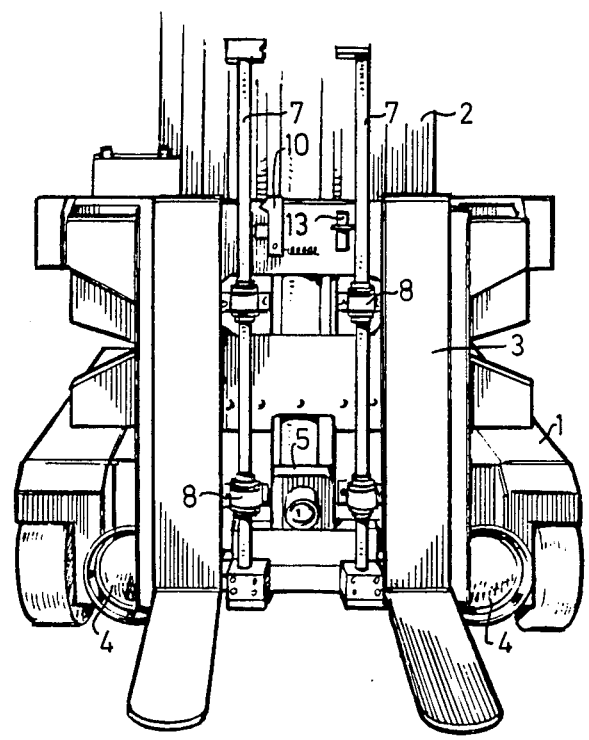
Figure 3A:
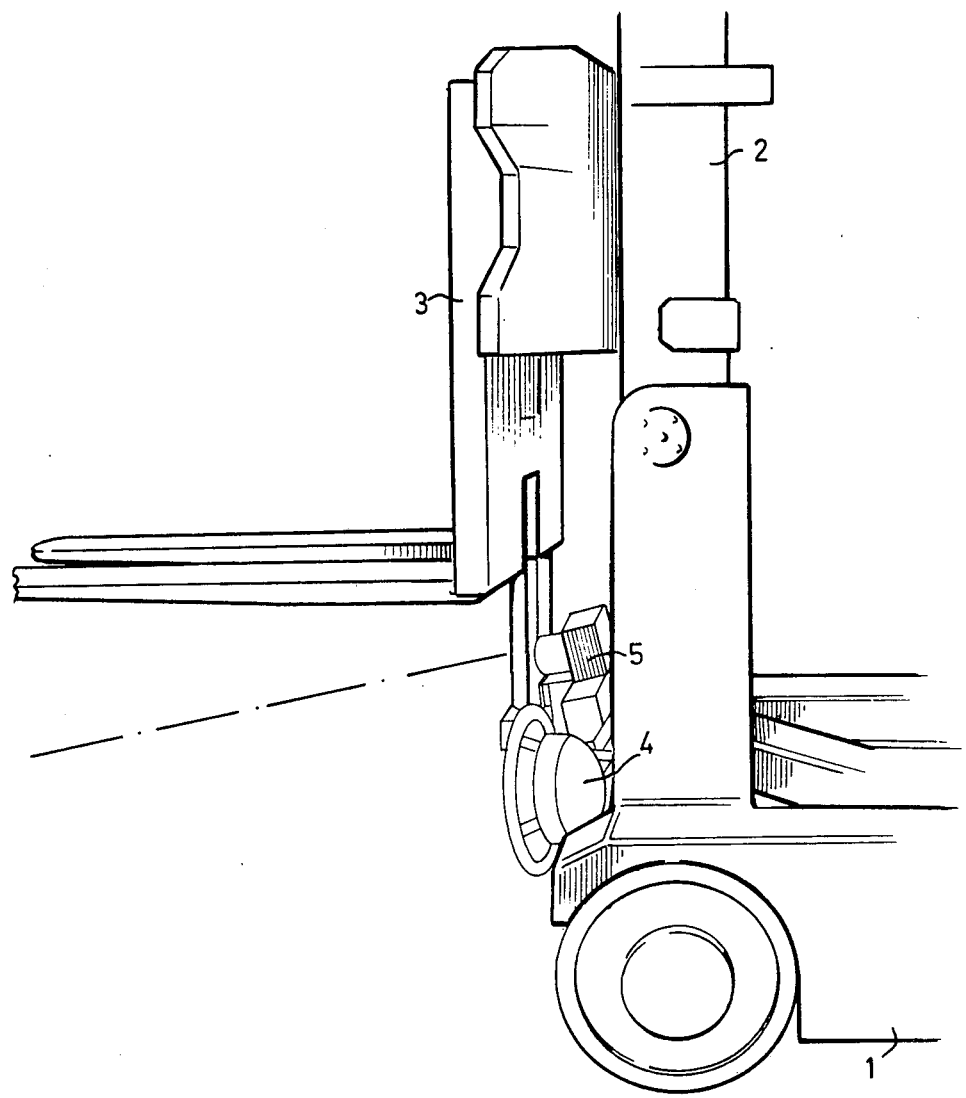
Figure 3B:
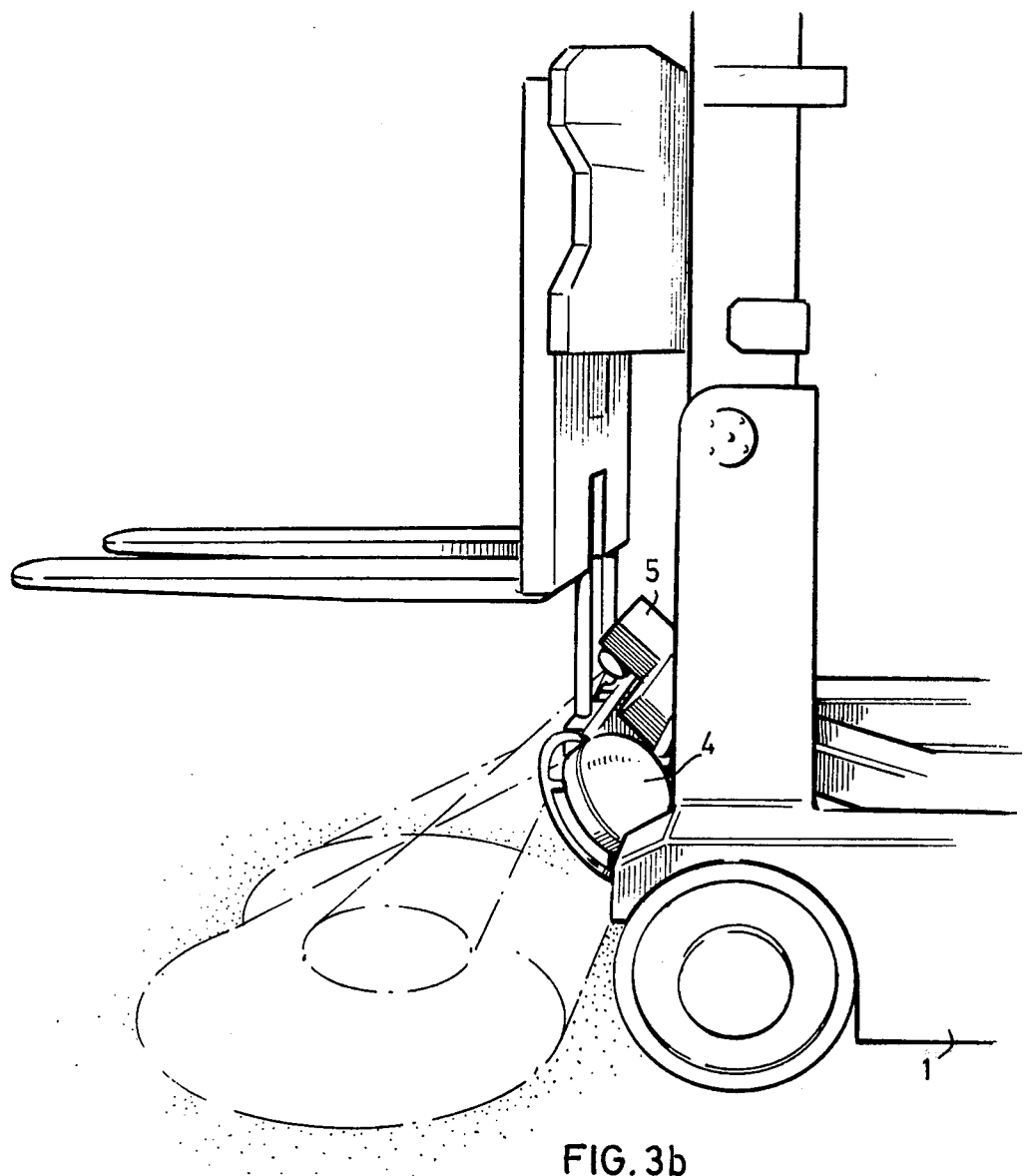
Figure 4A:
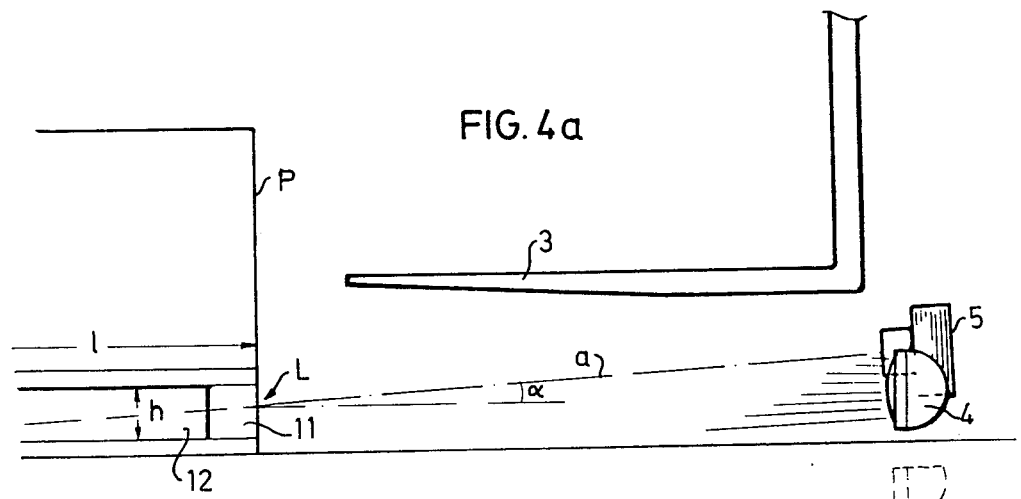
Figure 4C:
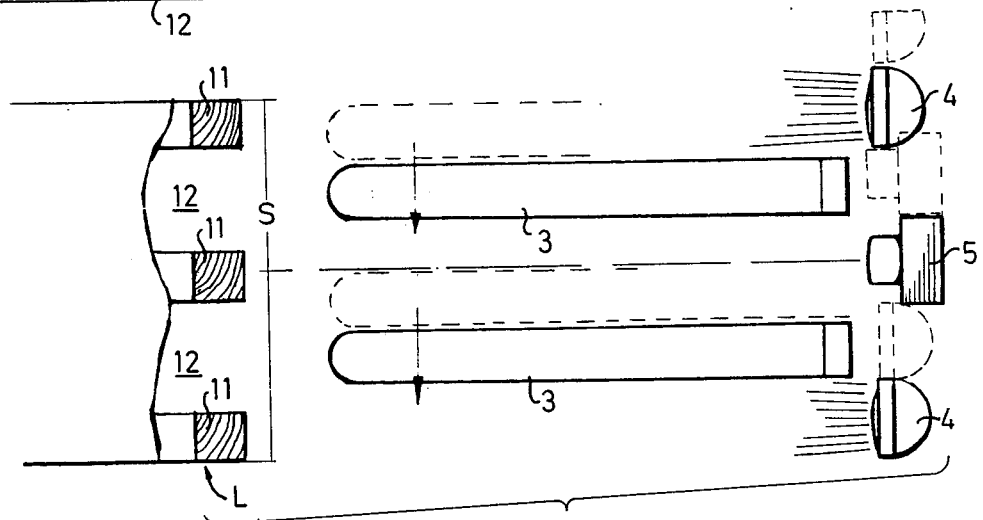
Figure 4B:
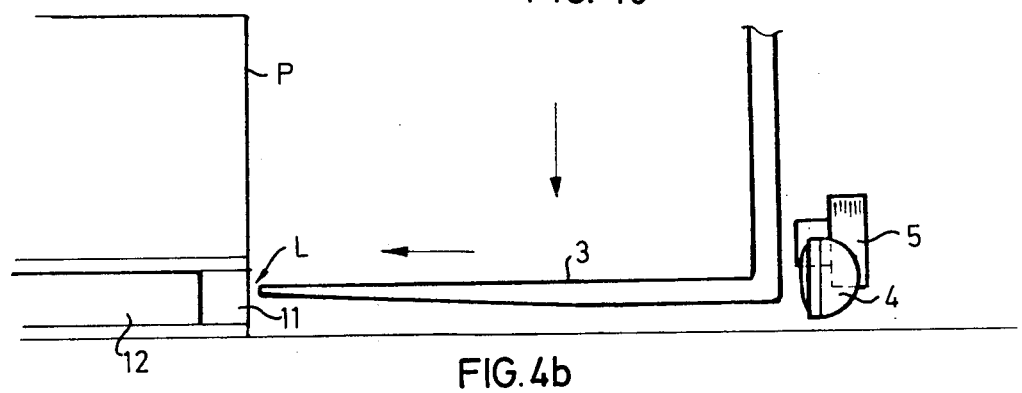
Figure 5:
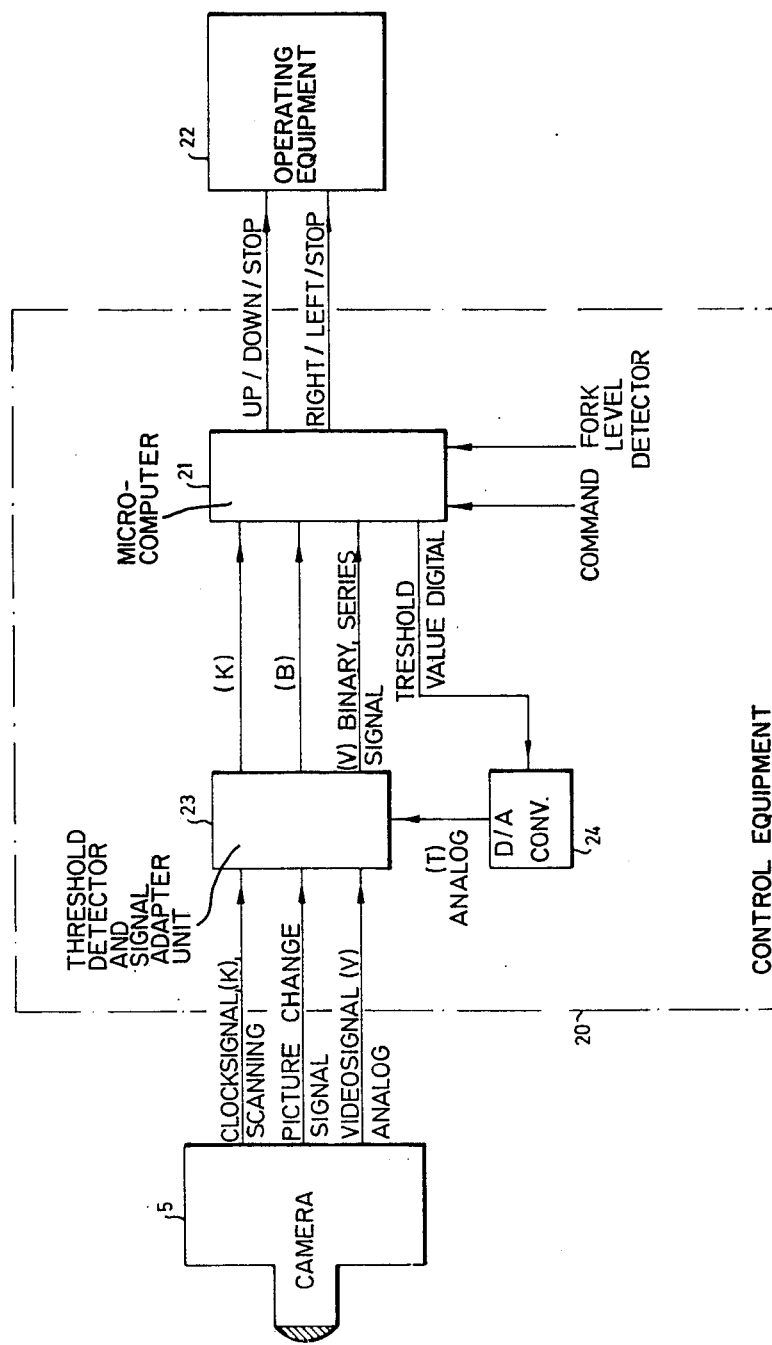
Figure 6:
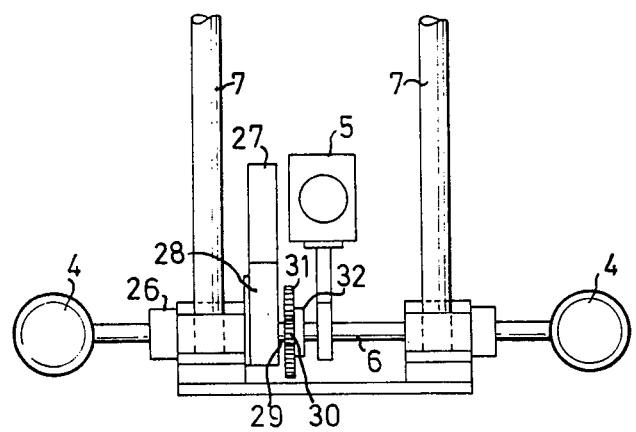

Additional advantages and characterizing features of the invention will become evident from the following description with reference to examples shown in the accompanying drawings, in which FIGS. 1*a* and 1*b* show perspective views from the front of a portion of a reach truck comprising the device according to the invention, FIG. 2 a view corresponding to FIG. 1 but with the fork moved to its lowest position, FIGS. 3*a* and 3*b* perspective views from the side of the truck in FIGS. 1 and 2, FIGS. 4*a* and 4*b* schematic side views illustrating the vertical positioning of a fork in relation to a loaded pallet, FIG. 4*c* a view from above of the fork and the loading pallet, illustrating the lateral positioning of the fork, FIG. 5 a block diagram of an embodiment of a device according to the invention, and FIG. 6 a schematic front view of the arrangement for turning a camera and headlights.

FIGS. 1-3 show the front section of a reach truck. The truck has a wheel-carried undercarriage 1, which can have equipment (not shown in more detail here) for remote control of the truck. This can be equipment which is known per se, comprising antennae for receiving signals from a control wire in the floor on which the truck runs, and steering and control equipment for controlling steering and driving motors coupled to the wheels, dependent on the signals received by the antennae.

A reaching mast generally designated 2 is disposed on the truck undercarriage 1 for horizontal displacement relative to the undercarriage. The mast 2 itself as well as the devices for displacing the mast 2 relative to the undercarriage 1 can be of any suitable design known per se and are therefore not shown in more detail here. A lifting fork 3 is vertically and laterally displacably arranged on the mast 2, also in a manner known per se.

The truck described above in its remote-controlled version is designed to be included in automatic or semi-automatic systems for handling unit loads, e.g. for automatically loading or unloading goods on pallets of a certain standard type, for example a so-called Europe pallet, in racks. With the aid of the above-mentioned remote-control equipment or with another suitable steering equipment the truck is guided up to the desired action position in front of a pallet rack with shelves in several levels. The truck is placed with the forks 3 directed towards the pallet rack and receives, via the control wire, information on the level of the pallet which is to be picked up. The distance between the truck and the rack position is given within certain tolerances. Also, the truck stands so that by merely maneuvering the reach mast 2 and fork 3 up/down and lateral shifting of the fork, the bars of the fork can be inserted into the fork pockets of the intended pallet, pick up the pallet and return the fork with the load to the normal driving position.

Because of irregularities in the floor surface, elasticity in the fork suspension, dimensional inaccuracies in the pallet rack, measuring errors in the vertical measuring device, inclination of the fork mast 2, etc., it is necessary that it be possible to measure precisely the vertical and lateral position of the chosen loading pallet in relation to the forks 3 and to carry out the required steering correction to guide the forks into the fork pockets when retrieving the pallet.

For this purpose, the truck shown is provided with a pallet scanning device according to the invention which is based on an electro-optical technique of no-contact measurement. The pallet scanning device comprises an illuminating device in the form of two headlights 4 and an electro-optical detector camera 5, whose active field of vision is homogeneously illuminated by the headlights 4. The headlights 4 are elastically mounted in a transverse beam or shaft 6, which is borne at the lower end of two guides 7, which in turn are freely displacably journalled in bearings 8 on the fork construction 3. There is an end stop 13 at the upper ends of the guides 7, which determines the lower end position in relation to the fork 3. The camera 5 is arranged on a support 9 between the guides 7 so that the camera 5 is elevated in relation to the headlights 4. At the upper end of one of the guides 7 there is a switch 10 for the camera, which is disposed to shut off the camera when the headlights 4 and the camera 5 move from the position shown in FIG. 1 to that shown in FIG. 2 as the fork 3 is lowered to floor level (see also FIGS. 4a and 4b). By making the pallet scanner raisable and lowerable in the manner shown and described, it is well protected behind the fork 3 even when it is lowered to take pallets at floor level.

FIGS. 4a-4c illustrate the placement and setting of the truck fork 3, headlights 4 and camera 5 in front of a loading pallet L which can be a so-called Europe pallet, whose lifting side S is 800 mm and whose foot blocks 11 are cubes measuring 100 mm on a side. As can be seen from FIG. 4a (see also FIG. 1), the headlights 4 and the camera 5 are located in all lifting situations, except for taking a pallet from floor level, below the fork 3 so that a load does not block the camera's view forward. The camera 5 is inclined somewhat forward so that its optical axis a intersects the vertical frontal plane P of the pallet L at an angle α which deviates somewhat from the angle of incidence 0° (90° to the frontal surface). The angle α is chosen so that the optical axis of the camera does not extend right through the cavity 12 between the blocks 11 of the pallet. Then the camera 5 cannot "see" straight through the pallet; the field of vision along the optical axis is limited by the upper (or lower) horizontal planes of the pallet. The smallest angle α is thus determined by the dimensions of the pallet L, i.e. the ratio between the height h and length l of the fork pockets 12. This positioning of the camera prevents the camera from picking up any light objects behind the pallet L (as viewed from the forks 3) and misinterpreting them as a portion of the object in the object plane, e.g. plane P along the front surface of the pallet L.

The headlights 4 are arranged so that they illuminate the front of the pallet with an angle of incidence of about 0° to make the contrast between objects 11 in the object plane and the cavity effect in the fork pockets 12 as great as possible. The effect is more pronounced as the rays of light are more nearly parallel with the horizontal limiting surfaces of the fork pockets. For this reason, and to achieve a homogeneous illumination of the object plane, the headlights 4 are placed with about the same spacing as the outer foot blocks 11 of the pallet L, so that the headlights 4 are right in front of the blocks 11 when the fork 3 is correctly positioned.

The purpose of the orientation described above of the headlights 4 and the electro-optical detector or camera 5 in relation to the pallet L, is to make it possible to create an image of the pallet which in a simple and unambiguous manner displays the essential geometric, easily identifiable characteristics of the pallet. By placing the camera 5 practically perpendicular in front of the sides of the pallet and by using contrasts in the object plane P between an illuminated, flat surface and adjacent cavities, i.e. between the surface of the blocks 11 and the fork pockets 12, a three-dimensional pattern recognition problem is reduced to one in two dimensions with simple, well-defined surfaces in the image, which create a well-defined pattern.

In the embodiment described, the light-sensitive detector of camera 5 consists of a number of photodiodes which are arranged, in a manner known per se, in a line (a so-called array detector) and which are all exposed simultaneously. The array is mounted in the image plane of the camera so that the line along which the detector elements are arranged is approximately parallel to the upper plane (horizontal) of the pallet. The video signal which is generated as the diodes are read (in series form), is in principle formed as a pulse train with a voltage pulse from each diode, whose size is a function of the accumulated incident illumination during the exposure period. The video signal corresponds to the signal from a linear sweep in a TV camera. The result of the exposure is thus a one-dimensional image. In order that this image will be sufficient to determine the position of the pallet L laterally in relation to the fork 3 (the optical axis of the camera), the lateral extent of the camera's image field is at least as long as the length S of the lifting side of the pallet L plus the maximum allowable lateral error. In other words, the camera's lateral reach should be greater than the error tolerance in positioning with the automatic remote control system used in the truck. Since the camera 5 is movable with the fork 3, the required scanning is achieved for using a one-dimensional camera to determine vertical position, by the camera or array detector 5 being exposed image by image like the film in a motion picture camera, while the fork 3 is raised or lowered within the height range where the pallet sought is expected to be.

FIG. 5 shows a block diagram of the pallet scanning device according to the invention. The camera 5 contains a photodiode detector of the type "linear array" with control electronics and amplifier and is coupled to control equipment, generally designated 20, which comprises a microcomputer 21, a threshold detector and signal adapter unit 23 and a D/A converter 24. The control equipment 20 is connected to operating equipment 22 which gives signals to the devices on the truck which control the positioning of the fork 3. For example, the operating equipment can control magnetic valves which, in a manner known per se, guide the flow to and from hydraulic positioning devices for the fork 3.

The truck receives via its remote control system, e.g. the previously mentioned control wire, information concerning which pallet in the pallet rack is to be picked up. This information contains data concerning the position on the floor corresponding to the position of the pallet in question and the height at which the pallet rests. Alternatively, the number of the pallet in vertical order can be given, e.g. the top one, third from the bottom etc. When the truck has assumed the chosen position on the floor with the fork 3 pointed toward the pallet rack, the fork is raised with the headlights 4 and camera 5. When the lower limit for the scanning range is reached, the headlights are turned on and the camera activated. Due to the fact that the pallets can be darker or lighter, depending on whether or not they are old or new, wet or dry, every other image is evaluated with a threshold value in the computer 21 which corresponds to very dark pallets, and every other image with a threshold value which corresponds to light-colored pallets. The fork is raised to the upper limit of the scanning area, and the computer stores information as to whether an acceptable pallet has passed the field of vision and which threshold setting has registered the most "hits". The best setting is locked in and the fork 3 is lowered slowly for high precision and to reduce the oscillations of the mast 2. The lowering continues until the pallet has been identified during a predetermined number of exposures in sequence (possibly with several spaces), whereupon the fork stops and the lateral error is determined. The control equipment 20 gives a signal depending on the size of the lateral error to the operating equipment 22, which acts on the means for lateral displacement of the fork 3, e.g. the previously mentioned magnetic valves, so that the fork 3, together with the headlights 4 and the camera 5, are moved to the side until they stand in the correct lateral position within a predetermined tolerance range, as indicated in FIG. 4c.

After the lateral positioning is completed, the fork 3 is again lowered slowly until it reaches the height limit where the camera 5 no longer "sees" the pallet. This height limit is defined as that where the first break in a succession of indentifying pallet images is registered in the computer 21. To be counted as a break, a number of exposures without registration of pallet images must follow directly after the first break. The computer 21 is then programmed to lower the fork 3 the additional distance required to compensate for the difference in height between the height where the optical axis a of the camera 5 hits the pallet pocket 12 and where the fork tips point into the pocket 12 (cf. FIGS. 4a and 4b).

When the fork 3 has been adjusted vertically and laterally in this manner, the operation continues in the normal manner, i.e. the fork 3 is inserted into the pallet pockets 12, is possibly inclined and is raised so that the pallet is free from the shelf in the pallet rack. Contact strips (not shown) or the like at the base of the fork can then register when the fork is completely inserted under the pallet. The mast 2 is then moved to its innermost position and the fork is lowered to the driving position.

Through the previously described suspension of the headlights 4 and camera 5 on the vertical guides 7, the device can be used in a corresponding manner to pick up pallets from the floor (See FIG. 4b).

In addition to being vertically displacable, the headlights 4 and the camera 5 can be turned as illustrated in FIGS. 1b and 3b, so that they can be directed down towards the floor to identify markings on the floor, e.g. a stop mark, steering mark or the like.

FIG. 6 shows schematically an arrangement for turning the headlights 4 and the camera 5. These are connected with a shaft 6 which is rotatably journalled in bearings 26 at the lower ends of the guides 7. One guide 7 carries an electric motor 27 with a gearing mechanism 28 which has an output shaft 29 with a driving gear 30. The gear 30 engages a gear 31 which has a hub 32 fixedly joined to the shaft 6. When the gear 31 is driven by the drive gear 30, the shaft 6 will consequently be turned so that the headlight 4 and camera 5 can be inclined forward a certain angle from the vertical position shown to a forwardly inclined position (FIGS. 1b and 3b).

The device according to the invention can also be used for determining some of the characteristic dimensions of the pallet, to distinguish different types of pallets and to check that the pallet has not been damaged. The computer 21 can be programmed to accept pallets which agree to 85% with an ideal pallet, and reject pallets below this limit. In this manner unacceptable pallets can be automatically sorted out. The device can be self-calibrating, with the truck after every work cycle passing a test pallet, which is precisely above the limit for acceptable in order to check the "sight" of the device, for example if the headlights have become weaker.

The invention has been described in the preceding with reference to a preferred embodiment, but different modifications are, of course, possible within the scope of the idea of the invention. Thus it is conceivable to place the light sources on the undersides of the fork tips and to use separate light sources to illuminate the floor, whilst merely turning and positioning the camera so that it is pointed towards the floor.

What I claim is:

1. In a device for orienting a lift fork on a fork-lift truck in a certain position in relation to a pallet having a hole therethrough, comprising light-emitting means movable with the lift fork and disposed to illuminate the pallet, a photoelectric detector which is movable together with the lift fork, electronic control equipment connected to the photoelectric detector to receive signals from the same, and operating equipment for the lift fork, connected to the control equipment for moving the lift fork dependent on signals from the control equipment, an image consisting of lighter and darker fields being created on the pallet within a scanning area for the photoelectric detector, the control and operating equipment being disposed to move the lift fork with the photoelectric detector in one direction over the scanning area, the detector being arranged during this movement to scan the pallet to register said light and dark fields and send signals to the control and operating equipment for orientation of the lift fork depending on the location of the light and dark fields; the improvement in which the axes of said photoelectric detector and light-emitting means are vertically spaced from each other and are inclined toward each other, as seen from the side, in the direction of emission of light from said light-emitting means, at a sufficiently great angle that the point of convergence of said axes, as seen from the side, does not extend beyond the pallet.

2. Device according to claim 1, characterized in that the light-emitting means and the photoelectric detector are located in the vicinity of the rear portion of the fork and are arranged to be limitedly vertically displacable relative to the fork.

3. Device according to claim 2, characterized in that the light-emitting means and the photoelectric detector are joined with vertical guides, which are vertically displacable in bearings which are joined to the fork; that the light-emitting means are located behind the fork bars, whereby the light-emitting means and the detector are movable relative to the fork from a lower position under the fork determined by an end stop to an upper position level with or above the fork.

4. Device according to claim 1, characterized in that the light-emitting means and the photoelectric detector are turnably connected to the fork in such a manner that they can be directed down towards the supporting surface for the truck.

5. Device according to claim 1, characterized in that the light-emitting means are a pair of spaced headlights, with the photoelectric detector placed between the headlights.

6. Device according to claim 5, characterized in that the photoelectric detector is placed somewhat higher than the headlights and is inclined relative to the same.

7. Device according to claim 5, characterized in that the distance between the headlights is greater than between the bars of the fork, so that the headlights are placed outside the fork bars.

8. Device according to claim 1, characterized in that the photoelectric detector has a plurality of photodiodes arranged in a line.

9. Device according to claim 8, characterized in that the electronic control equipment is disposed to evaluate the exposures of the detector so that it sorts out areas whose appearance deviates to a predetermined degree from a certain appearance.

10. Device according to claim 1, characterized in that the electronic control equipment is disposed to evaluate the exposures of the photoelectric detector with two different threshold values, every-other one corresponding to very dark areas and every-other one corresponding to very light areas.

11. Device according to claim 1, characterized in that the light-emitting means is mounted for movement on the lift fork.

12. Device according to claim 1, characterized in that means are provided to illuminate the surface supporting the truck and to adjust the detector to scan said surface.

* * * * *